(12) United States Patent
Roehrborn

(10) Patent No.: US 6,622,824 B2
(45) Date of Patent: Sep. 23, 2003

(54) LUBRICATION SUPPLY SYSTEM FOR A MACHINE

(76) Inventor: Daniel H. Roehrborn, 232 S. Rohlwing Rd., Palatine, IL (US) 60067

(*) Notice: Subject to any disclaimer, the term of this patent is extended or adjusted under 35 U.S.C. 154(b) by 0 days.

(21) Appl. No.: 09/800,807

(22) Filed: Mar. 7, 2001

(65) Prior Publication Data
US 2002/0125074 A1 Sep. 12, 2002

(51) Int. Cl.$^7$ ............................. F16N 27/00; F01M 9/00
(52) U.S. Cl. ......................................... 184/6.1; 184/7.4
(58) Field of Search ........................... 184/6.1, 6.14, 184/6.24, 6.28, 6.29, 7.4, 55.1, 54, 58

(56) References Cited

U.S. PATENT DOCUMENTS

| 4,444,292 A | * | 4/1984 | Brown et al. ............... 184/6.4 |
| 4,674,030 A | * | 6/1987 | Gabriel et al. ............. 184/6.4 |
| 5,038,893 A | * | 8/1991 | Willner et al. ............. 184/7.4 |
| 5,970,942 A | * | 10/1999 | Koeberlein et al. ..... 123/196 R |
| 6,085,869 A | * | 7/2000 | Ing et al. .................. 184/55.1 |
| 6,105,724 A | * | 8/2000 | Stitz et al. .................. 184/7.4 |
| 6,213,080 B1 | * | 4/2001 | Marsh et al. .......... 123/196 R |

* cited by examiner

Primary Examiner—Christopher P. Schwartz
(74) Attorney, Agent, or Firm—Wallenstein & Wagner, Ltd.

(57) ABSTRACT

The present invention is a lubrication supply system for a self-lubricating machine that provides filling of a lubricant reservoir of the machine directly from a supply reservoir. The system includes a supply reservoir in fluid communication with the machine reservoir, a transfer mechanism in communication with the supply reservoir and the machine reservoir, and a control system in communication with the transfer mechanism, wherein the control system controls operation of the pump to maintain a predetermined lubricant level within the reservoir. The system of the present invention allows for lubricant to be supplied directly from an original supply container of lubricant from the lubricant manufacturer or supplier, as well as any other type of container.

46 Claims, 4 Drawing Sheets

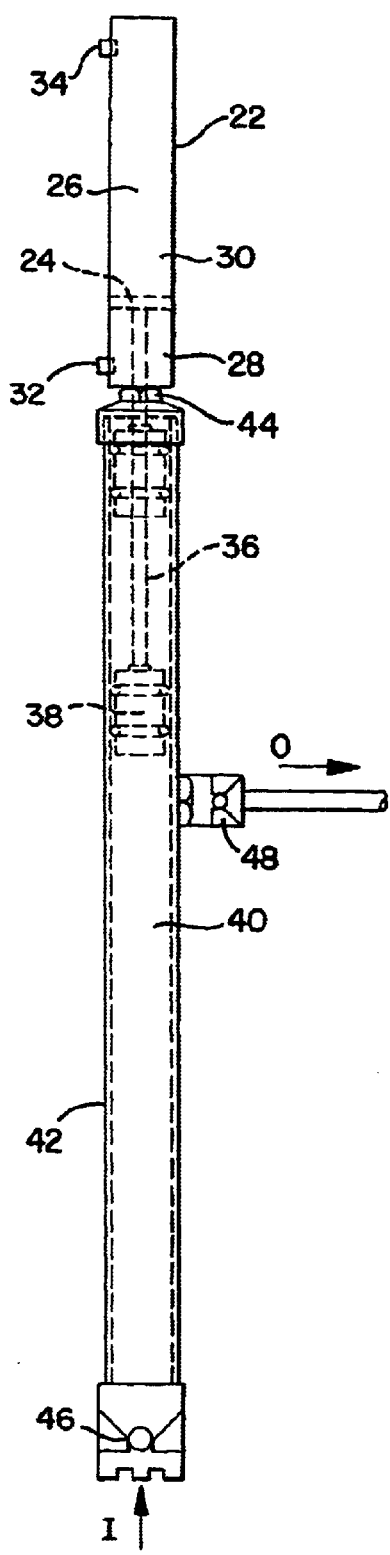
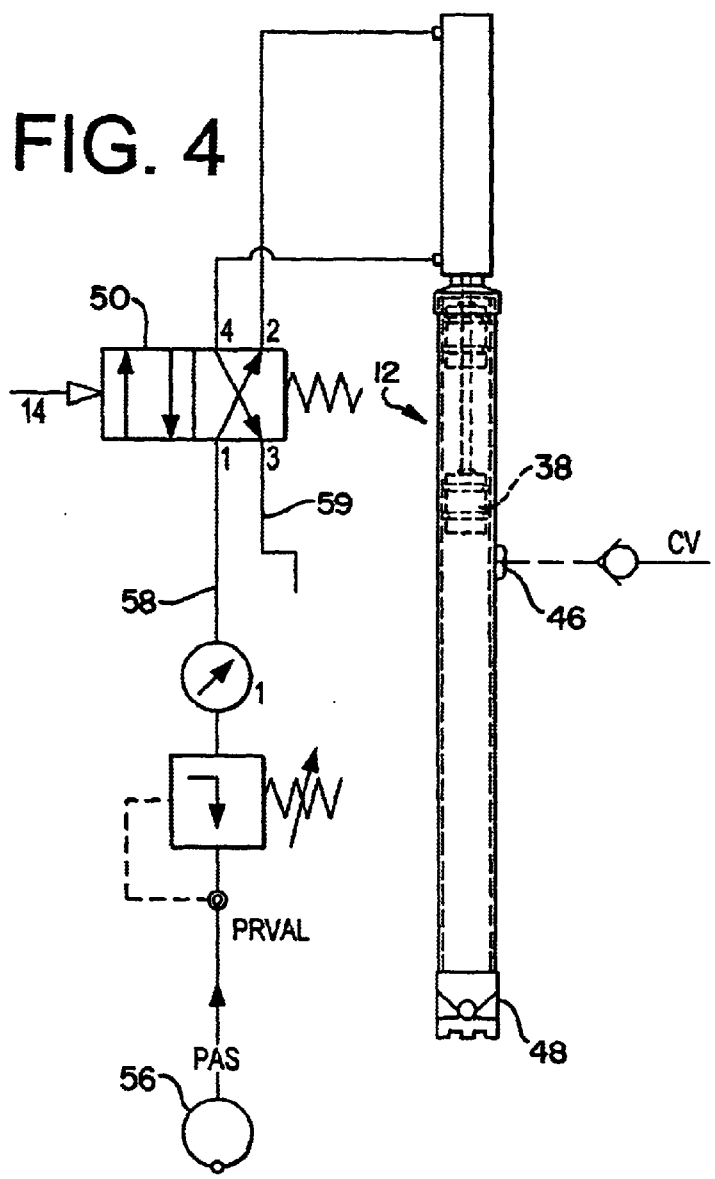

LUBRICATION SUPPLY SYSTEM FOR A MACHINE

TECHNICAL FIELD

The present invention generally relates to lubrication systems. More particularly, the present invention relates to a lubrication system that supplies lubricant from a supply reservoir directly to a lubricant reservoir of a machine.

BACKGROUND OF THE INVENTION

Industrial machinery requires proper lubrication between contacting parts to insure movement of the parts and to minimize wear of part surfaces. Lubrication also provides a medium for the suspension of particulate matter that could otherwise cause damage to part surfaces as well as seizure of moving parts. Additionally, lubrication facilitates dissipation of heat generated by friction between moving parts. All of these lubricant functions promote proper operation of machinery, prevent machinery failure, and promote longer machinery life. Therefore, a system for providing lubrication to industrial machinery is extremely important.

In industrial manufacturing applications, many types of machinery typically have a lubrication supply system. Many machines are equipped with automatic lubrication supply devices to lubricate mechanisms of the machine. These lubrication systems are typically referred to as "total-loss systems" because the lubricant that is pumped throughout the machine is not recovered and recycled through the machine, such as in a closed loop system. After being pumped to the lubrication points within the machine, the lubricant simply flows through effluent conduits, such as channels, to a collection point where this "waste lubricant" is collected in a container, such as a coolant tank of the machine.

These lubrication systems typically utilize a pump to facilitate movement of lubricant through the system. The pump periodically cycles by use of a timer function programmed in a programmable machine controller (PMC). The machine typically includes a lubricant reservoir having a float switch. When the lubricant level in the reservoir falls to a point where the float switch in the reservoir activates, the machine is put into an alarm condition and automatic operation of the machine can no longer be performed. The lubricant in the reservoir must be replenished to restore full automatic function of the machine. A machine operator must fill the reservoir with lubricant and then reset the machine.

Typically, lubricants for re-fill are supplied in 55-gallon drums or 5-gallon pails and stored in a storage area away from the machines. It is usually not practical to keep large drums on the production floor near the machines. Accordingly, when a machine reservoir must be filled, a person has to transport re-fill lubricant from the storage area in a container. In many cases, this container is make-shift and may still contain some content from the original use of the container (e.g., soft-drinks, laundry detergents, other types of lubricant, etc.). Additionally, contaminants such as metal chips, dust, and other matter often collect within the containers as they are stored near the machine. As such, when the container is filled with clean lubricant from the supply container, the lubricant is contaminated. Despite this contamination, the lubricant is poured from these containers into the reservoir of the machine.

Another source of contamination is through the use of a funnel. The reservoirs of the machines are typically located in tight spaces behind access covers or behind the machines. Thus, a funnel is often required when attempting to fill the reservoir. The funnel may have contaminants on its inner surface. Furthermore, the funnel sometimes may not fit directly above the reservoir and therefore must be tilted in order to get the lubricant to flow properly. This tilting can cause the lubricant to be misdirected and spill outside of the machine and onto the floor in the area around the machine, thus creating a hazard.

Typically, lubricant is distributed throughout the machine through steel, plastic, or copper tubing and applied at discharge points through special manifolds. Some of these manifolds can meter the amount of oil applied to surfaces at each cycle of the pump. When contaminated oil flows into these manifolds, the valves, or other metering structures, in the manifolds can malfunction. For example, the valves can be held open by debris in the oil and the metering function cannot work properly. As a result, the machine might start to consume several times the normal amount of lubricant. On the other hand, debris can also stifle lubrication supply to a point where the machine is under-lubricated, which could cause one or more mechanisms within the machine to seize-up and malfunction.

Because the valves on the distribution manifolds cannot usually be cleaned well enough to restore their normal operation, the manifolds are typically replaced. These distribution manifolds can be located deep within the machine and can be extremely difficult to replace. One manifold can cost several hundred dollars to replace. There may be 5–25 such manifolds located throughout the machine. Thus, replacement can be very expensive.

Malfunctioning valves can also cause other problems. The pump of the lubrication system typically has a pressure switch located internally that must activate from a sufficient pressure increase at each cycle of the pump. If the pressure does not sufficiently increase due to improper valve functioning, the machine is put into an alarm condition. The machine can usually be restarted, but is stopped with the alarm condition at each timed cycle of the pump. Typically, this stoppage will occur every 10–30 minutes of automatic operation until the problem is corrected. This results in loss of production time.

An additional loss of production time results when an operator is required to transport lubricant from the storage location to the machine when the reservoir of the machine requires more lubricant. An operator typically has to walk to the lubricant storage location, fill a vessel, walk back to the machine, and then refill the reservoir. In most cases, the low level of the lubricant in the reservoir is not addressed by a machine operator until a "low lubricant level" alarm is generated on the machine. Full and automatic production ceases at that point until the oil is replenished.

With the advent of automatic production cells, this loss of production time can be considerably amplified. Many production cell systems contain robotic units and other moving equipment that can be dangerous to operators and require the entire cell to be contained by a cage. For safety reasons, the cage must be closed in order for the machines to operate automatically. A cell may contain several machines that will generate an alarm due to insufficient lubricant levels at different times. If one machine in the cell generates an alarm, the entire cell might have to be shut down during the lubricant replenishing process. In addition, cells are often interconnected by conveyor systems. Thus, if one cell shuts down, all the subsequent cells might also shut down.

All of these problems and concerns demonstrate a need for an improved lubrication system. The present invention satisfies that need by eliminating the aforementioned problems.

SUMMARY OF THE INVENTION

The present invention is a lubrication supply system for one or more self-lubricating machines that provides filling of a lubricant reservoir of the machine directly from a supply reservoir. In one embodiment, the system includes a supply reservoir in fluid communication with a machine reservoir that is fixed to the machine, a transfer mechanism in communication with the supply reservoir and the machine reservoir, and a control system in communication with the transfer mechanism. The control system can be a manual control or an automatic control based on input from a lubricant level indicator in communication with the machine reservoir. In a manual mode, an operator can manually operate the transfer mechanism based on input from the lubricant level indicator. In a preferred automatic control arrangement, the control system controls operation of the transfer mechanism in response to input from a lubricant level indicator when the lubricant level within the machine reservoir either falls below or is filled to a desired lubricant level.

The present invention contemplates embodiments wherein a single supply reservoir is in communication with a plurality of machine reservoirs, and wherein a plurality of supply reservoirs are in communication with a single machine reservoir. One or more transfer mechanisms can be utilized in these embodiments. The system of the present invention also contemplates supplying lubricant directly from a supply reservoir in the form of a container used to ship the lubricant, i.e., an original supply container from the lubricant manufacturer or supplier, thereby eliminating unnecessary transfers into intermediate containers and minimizing potential contamination of the lubricant.

In a preferred embodiment, the system includes a supply container of lubricant in fluid communication with a machine reservoir fixed to the machine, a pump in communication with the supply container and the machine reservoir, and a control system in communication with the machine reservoir and the pump, wherein the control system controls operation of the pump in response to input from a lubricant level indicator to maintain a desired lubricant level within the machine reservoir.

According to a particular aspect of the present invention, the pump can be disposed within the supply reservoir or attached thereto. In a preferred embodiment, the pump is a vacuum-operated piston pump operated by a pneumatic solenoid valve in communication with a pressure source and a control system. The control system determines when to operate the solenoid valve, and thus the pump, through input from a lubricant level indicator.

According to another aspect of the present invention, a connector is adapted to universally connect the supply system of the present invention to a plurality of different reservoir openings associated with machine reservoirs of various types of machines. The connector is preferably a cap that includes a lubricant level indicator.

The present invention also incorporates a method of supplying lubricant to a reservoir of a machine from a supply reservoir of lubricant. The method comprises the steps of transferring lubricant directly from the supply reservoir to the machine reservoir when the lubricant falls below a desired fill level within the machine reservoir, stopping the transfer of lubricant when the lubricant reaches the desired level within the machine reservoir or stopping transfer after a predetermined amount of time expires, and resetting the predetermined amount of time when the lubricant reaches the predetermined level before the predetermined amount of time expires. Additionally, the method can include the step of triggering an indicator when the predetermined amount of time expires. The method also contemplates the step of initially transferring lubricant from the supply reservoir to the machine reservoir to the desired level by temporarily overriding the timing step, thereby preventing stoppage of the initial lubricant transfer when the predetermined amount of time expires before the desired level is reached.

These and many other aspects of the present invention will become apparent from the following detailed description of a particular embodiment of the invention when considered in conjunction with the accompanying drawings.

BRIEF DESCRIPTION OF THE DRAWINGS

FIG. 3 is a cross-section of a schematic diagram of a piston pump utilized in the lubrication system of FIG. 2.

FIG. 4 is a schematic diagram of the pump of FIG. 3 connected to a pneumatic solenoid valve, which is in communication with a pressure source.

DETAILED DESCRIPTION OF THE PREFERRED EMBODIMENTS

While the present invention will be described fully hereinafter with reference to the accompanying drawings, in which a particular embodiment is shown, it is to be understood at the outset that persons skilled in the art may modify the invention herein described while still achieving the desired result of this invention. Accordingly, the description which follows is to be understood as a broad informative disclosure directed to persons skilled in the appropriate arts and not as limitations of the present invention.

Figure 1:
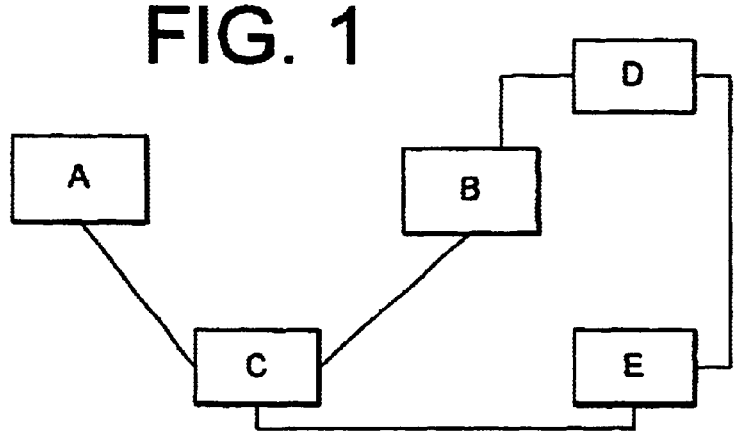
FIG. 1 is a schematic block diagram of an embodiment of a lubrication supply system in accordance with the present invention.

FIG. 1 schematically depicts a basic embodiment of a lubrication supply system of the present invention. The lubrication supply system facilitates transfer of lubricant directly from a supply reservoir A to a machine reservoir B of a self-lubricating machine. The system can be utilized in connection with any type of self-lubricating machine, such as a machine tool, lathe, stamping press, printing press, or the like. The machine reservoir B is a fixed part of the self-lubrication system of the machine and is therefore integral with the machine. A transfer mechanism C transfers lubricant from the supply reservoir A to the machine reservoir B when the level of lubricant within the machine reservoir B is low. Thus, it is important to know when the lubricant level is low. A low lubricant level can be communicated based on input from a passive or active lubricant level indicator D, such as a sight glass indicator or some type of fluid sensor. When the lubricant level falls below a desired level as determined from the lubricant level indicator D, the system allows lubricant to be directly transferred from the supply reservoir A to the machine reservoir B. Thus, the system facilitates transfer of lubricant without the use of an intermediate reservoir or container.

The system also includes a control system E. In a manual control system arrangement, an operator can operate the transfer mechanism C based on input from either an passive or active lubricant level indicator D. Thus, the operator controls the amount of lubricant transferred to the machine reservoir B. In an automatic control system arrangement, transfer of lubricant is automatically facilitated by the control system E in communication with the transfer mechanism C and an active lubricant level indicator D. In a particular embodiment for both manual and automatic operation, the control system E can be configured to operate the transfer mechanism C (based on input from the level indicator D) until a predetermined amount of lubricant is transferred to the machine reservoir B. In this type of arrangement, lubricant usage by the machine would have to be calibrated to determine the predetermined amount of lubricant to be transferred. Alternatively, the transfer mechanism C can be stopped by the control system E when the active level indicator D indicates that the lubricant has reached a desired level.

In a preferred type of arrangement, a fluid sensor is utilized as the active level indicator D. The control system E starts operation of the transfer mechanism C when the lubricant level falls below the desired level as determined by the sensor and also stops operation of the transfer mechanism C when the desired lubricant level within the machine reservoir B is reached also as determined by the sensor. In yet another embodiment, a timing mechanism (not shown) can be implemented in the control system E so that it operates the transfer mechanism C for a predetermined period of time after the sensor has been triggered. In addition to the sensor stopping operation of the transfer mechanism C, the timer also stops operation of the transfer mechanism C after the predetermined period of time expires. The predetermined period of time can be calibrated to correlate to a fixed amount of lubricant based on lubricant transfer rates. The timing mechanism thus provides a safety mechanism when the supply reservoir A becomes empty or when the system fails. An alarm may be implemented to indicate when the time period has expired.

Figure 2:
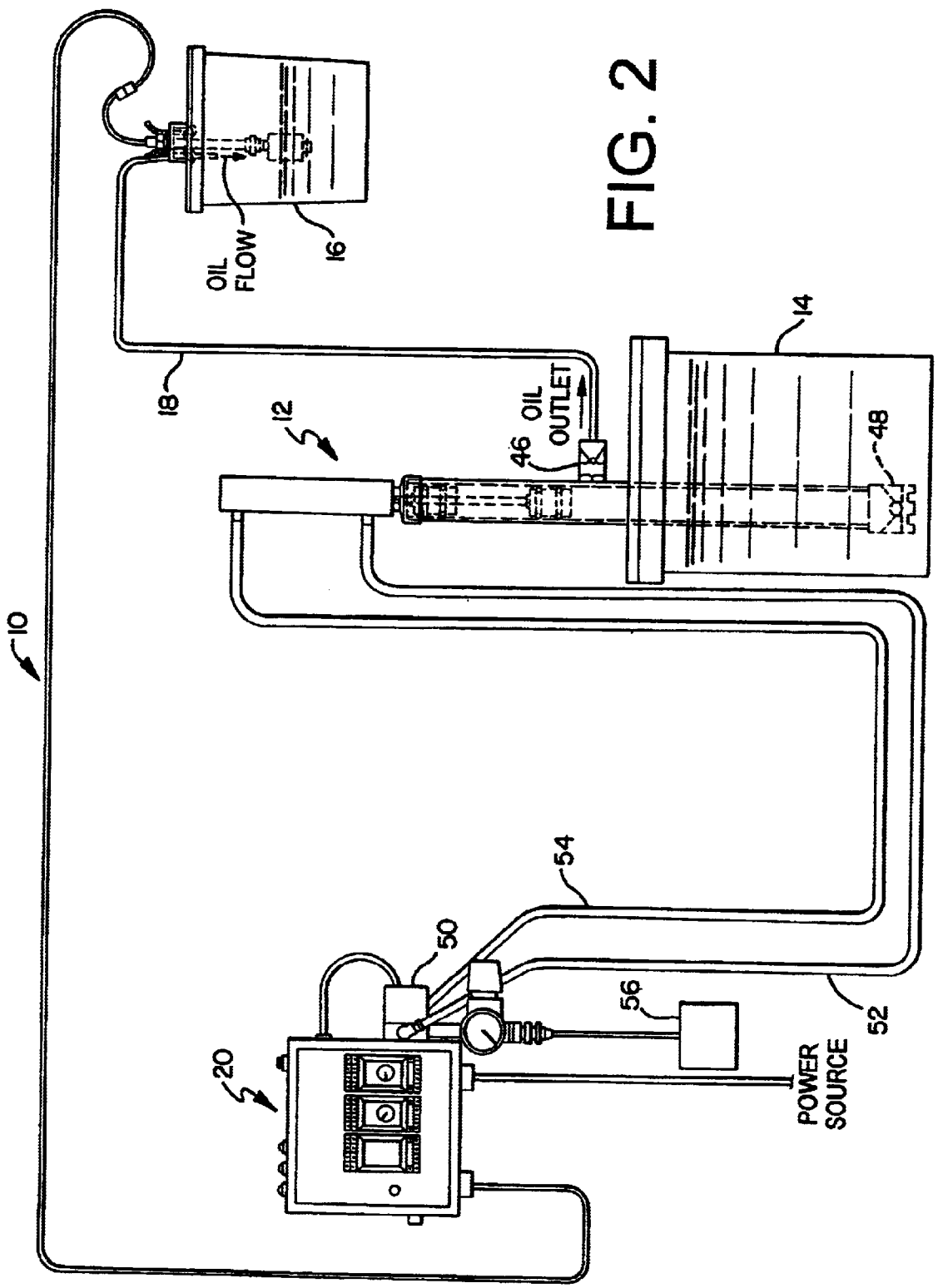
FIG. 2 is a schematic diagram of a specific embodiment of the lubrication supply system of FIG. 1.

Referring now to a more specific embodiment, a lubrication supply system 10 of the present invention is shown in FIG. 2. The system 10 includes a transfer mechanism in the form of a pump 12 in fluid communication with a supply reservoir in the form of a container 14 of lubricant. Alternatively, the transfer mechanism could also be a gravity-feed type of mechanism. The pump 12 is also in fluid communication with a reservoir 16 of a self-lubricating machine (not shown) via a supply line, or fluid conduit 18. The machine reservoir 16 is part of a lubrication system of the self-lubricating machine and is an integral part of the machine. The system 10 also includes a control unit 20 to effectuate and control automatic filling of the reservoir 16. Preferably, the pump 12 is a vacuum-operated piston pump, since this type of pump is more cost effective to operate than other types of pumps. However, any type of pump could be utilized to effectuate transfer of lubricant from the container 14 to the reservoir 16 via the conduit 18, such as a peristaltic pump, centrifugal pump, or any other type of pump well known in the art of fluid mechanics. The pump can also be a submersible pump disposed within the container 14 or a non-submersible pump disposed outside the container 14.

The preferred vacuum-operated piston pump is shown in FIG. 2 and is described herein. In FIG. 1, the pump 12 is vertically disposed with respect to the container 14. However, the pump 12 can be disposed in any position that facilitates transfer of lubricant from the container 14. The container 14 can be any type of supply reservoir or container, but preferably, is a container in which the lubricant was shipped, i.e., an original supply container from the lubricant manufacturer or supplier. The use of an original supply container eliminates unnecessary transfers into intermediate containers, thereby minimizing contamination of the lubricant with foreign substances. When the original supply container becomes empty, the pump 12 can simply be inserted into a full container. In order to minimize the amount of lubricant left within the container after a change is necessitated, the container can optionally be positioned at an angle with respect to the pump so that the pump can access more lubricant than if the pump was disposed perpendicular to the bottom of the container.

The preferred piston pump 12 is shown in FIG. 3. The pump 12 includes a first portion 22 that contains a piston 24 disposed within a chamber 26. The piston 24 effectively defines a first chamber 28 and a second chamber 30 within the first portion 22 of the pump 12. A first pressure inlet 32 is in communication with the first chamber 28 and a second pressure inlet 34 is in communication with the second chamber 30. The piston 24 is connected to one end of a piston rod 36. A plunger 38 is connected to the other end of the piston rod 36, as shown in FIG. 3. The plunger 38 is disposed within a fluid chamber 40 of a second portion 42 of the pump 12. The piston rod 36 passes through an aperture 44 between the first portion 22 and the second portion 42 of the pump 12. The fluid chamber 40 includes a lubricant inlet 46 and a lubricant outlet 48. Both the inlet 46 and the outlet 48 are one-way valves, or check valves. Preferably, the valves are ball-type valves. The inlet 46 only allows lubricant to enter the fluid chamber 40 and the outlet 48 only allows lubricant to exit the chamber 40, as indicated by arrows I and O in FIG. 3.

As shown in FIG. 2, the control unit 20 controls operation of a pneumatic solenoid valve 50 in communication with a pressure line 52 and a pressure line 54. The pressure line 52 is connected to the first pressure inlet 32 and the pressure line 54 is connected to the second pressure inlet 34 of the pump 12. The solenoid valve 50 is also in communication with a pressure source 56 via source line 58, as shown in FIG. 4. The solenoid valve 50 is also in communication with a pressure relief 59. The control system 20 controls the solenoid valve 50 to effectuate alternate switching of the pressure source 56 from communication with pressure line 52 and pressure line 54. When the pressure source is in communication with pressure line 52, the pressure relief 59 is in communication with pressure line 54. In the alternate position, when the pressure source 56 is in communication with pressure line 54, the pressure relief 59 is in communication with pressure line 52. The alternating pressure supplied by the pressure lines 52 and 54 is applied to the piston 24 within the first portion 22 of the pump 12. This effectuates reciprocating movement of the piston 24 within the first portion 22 of the pump 12, resulting in reciprocating movement of the plunger 38 connected to the piston 24 via the piston rod 36. The pressure relief 59 allows pressure to be released from the chamber 26 of the first portion 22 of the pump 12 when the piston 24 moves therein.

Referring again to FIG. 2, when the pressure source 56 is in communication with the pressure line 52, the piston 24 is forced upward within the first portion 22 of the pump 12. Thus, the plunger 38 also moves upward within the fluid chamber 40. This movement creates a negative (vacuum) pressure within the fluid chamber 40, which causes the lubricant inlet 46 to open and allow lubricant to enter the fluid chamber 40. The vacuum pressure created within the fluid chamber 40 during this movement causes the lubricant outlet 48 to close. Thus, lubricant cannot be pulled into the fluid chamber 40 through the lubricant outlet 48 during the upward movement of the plunger 38.

When the pressure source 56 is in communication with the pressure line 54, the piston 24 is forced downward within the first portion 22 of the pump 12. Thus, the plunger 38 also moves downward within the fluid chamber 40. This movement creates a positive pressure within the fluid chamber 40, which causes the lubricant outlet 48 to open and allow lubricant to exit the fluid chamber 40 and enter the supply line 18. The positive pressure created within the fluid chamber 40 during this movement causes the lubricant inlet 46 to close. Thus, lubricant cannot be forced back into the container 14 through the lubricant inlet 46 during the downward movement of the plunger 38.

Figure 5:
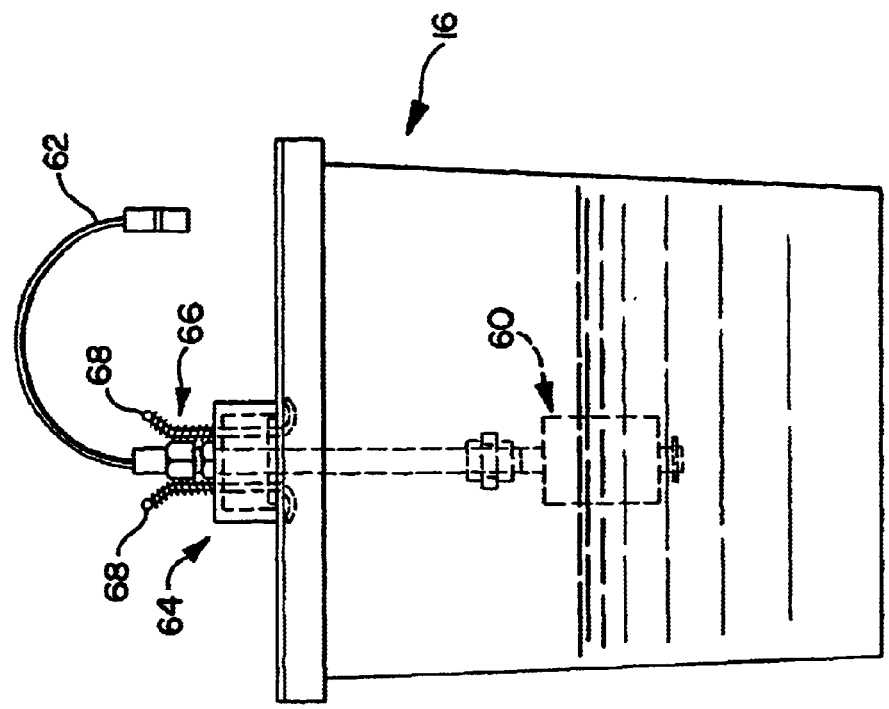
FIG. 5 is a cross-section of a schematic diagram of the machine reservoir of FIG. 2, the reservoir including an adjustable reservoir cap according to the invention.

The reservoir 16 is more fully depicted in FIG. 5. In this preferred embodiment, the reservoir 16 includes a sensor in the form of a float switch 60 in communication with the control unit 20 via a wire connection 62. The float switch 60 can be adjusted to define a reference level of lubricant within the reservoir 16. The reference level is a level at which the float switch 60 activates when the level of lubricant falls below this reference level. Likewise, the reference level is a level at which the float switch 60 deactivates when the lubricant reaches this reference level. There may be tolerances associated with the float switch 60 and, therefore, two reference levels may actually be defined, an activation level and a deactivation level. Other types of switches or sensors may also be utilized in lieu of the float switch 60, such as an optical sensor, pressure sensor, or the like.

An additional feature of the system 10 is a universal connector in the form of a reservoir cap 64. The cap 64 is adjustable to fit a variety of different reservoir openings found on various machines. This allows the system 10 to be utilized with a wide range of machines. The cap 64 includes a clamping device 66 that facilitates adjustability. The clamping device 66 includes spring-loaded hooks 68 that can be positioned to clamp the cap 64 securely to the existing lubricant reservoir 16 of the machine. The lubricant level indicator, in the form of the float switch 60, is integrated into the reservoir cap 64 so that the system can be implemented in a self-lubricating machine lacking its own switch or sensor. Alternatively, the system can still be implemented in a machine having its own switch or sensor. In this particular situation, the float switch can act as either a primary sensor or an auxiliary sensor. Thus, the control unit can rely upon signal input from either one, or both, sensors.

Figure 7:
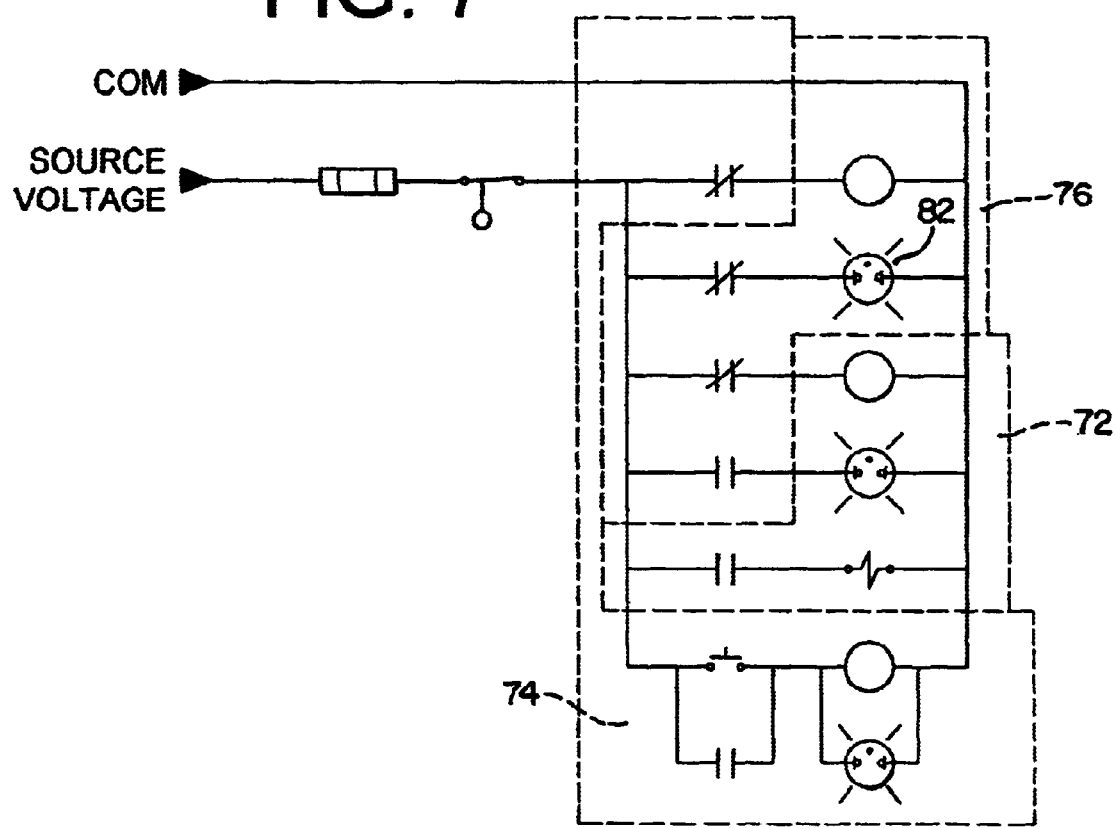
FIG. 7 is a schematic diagram of an embodiment of an electrical circuit of the control system of FIG. 6.
Figure 6:
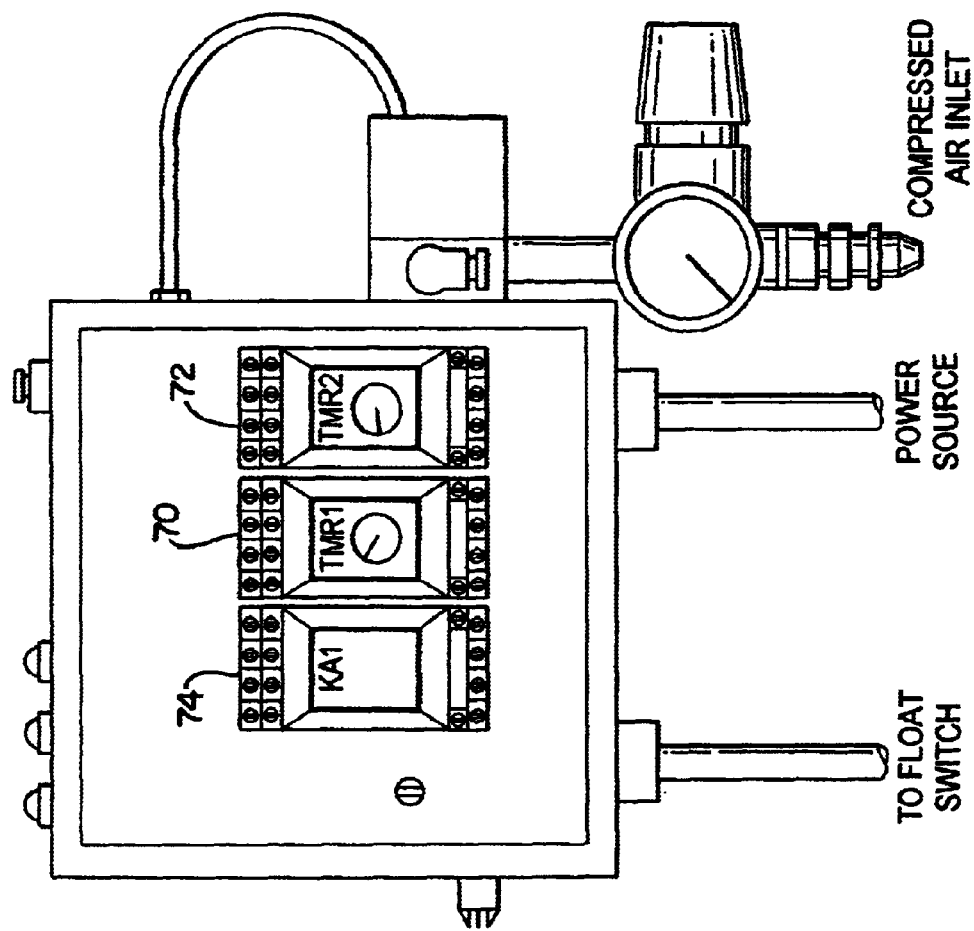
FIG. 6 is a schematic diagram of an embodiment of a control system of the system of FIG. 2.

The control unit 20 is more fully depicted in FIGS. 6 and 7. The control unit 20 provides control of the pneumatic solenoid valve 50 based, in part, on input from the float switch 60. The control unit 20 includes a pump switch 70, a timer relay 72, and an override switch 74. The pump switch 70 controls operation of the pump 12 and is in communication with the float switch 60 within the reservoir 16. The timer relay 72 allows the pump 12 to operate only for a given period of time. This time period can be preset. The override switch 74 bypasses the timer relay 72 to allow the pump 12 to operate until the float switch 60 activates, indicating that the reservoir 16 is full (i.e., the lubricant has reached the reference level). When the float switch 60 activates, the pump switch 70 turns off the pump 12.

A schematic diagram of a preferred embodiment of an electrical circuit of the control unit 20, wherein a vacuum-operated piston pump is utilized, is shown in FIG. 7. In this embodiment, the pump switch 70 is in the form of an interval relay 76. The interval function of the interval relay 76 causes alternating operation of the pneumatic solenoid valve 50, which, in turn, operates the pump 12 via the alternating pressure supplied to the pump 12. It should be understood that many different types of switching arrangements could be utilized without departing from the scope of the present invention. The functions of the control unit 20 could also be implemented via software, hardware, firmware, or any combination thereof. For example, the control unit 20 may utilize a microprocessor based system and related software to provide control functions.

With reference being made to FIGS. 2, 6 and 7, operation of the lubrication supply system 10 will now be described in more detail. When the new container 14 of lubricant is needed, the pump 12 is inserted into the container 14 of clean lubricant. Power is then applied to the control unit 20. Power can be supplied from the building or from the machine tool. The override switch 74 can be manually activated to initially fill the reservoir 16 to the reference level (or deactivation level). A manual fill indicator 80 can be provided to indicate operation in this mode. When the level of lubricant in the reservoir 16 has reached a level where the float switch 60 has been deactivated, the interval relay 76 will turn off the pump 12.

As the machine is operated, the level of lubricant in the reservoir 16 decreases. When the level falls below the reference level (or activation level), the float switch 60 activates. This activates the interval relay 76 and the timer relay 72 simultaneously. When the interval relay 76 is activated, an operation indicator 82 can be provided to indicate operation of the pump 12. The interval relay 76 controls the pneumatic solenoid valve 50 to operate the pump 12. The timer relay 72 operates for a preset period of time.

As the pump 12 continues to cycle, the oil level in the reservoir 16 of the machine tool rises. When the lubricant level in the reservoir 16 rises to a point at which the float switch 60 is de-activated, power to the interval relay 76, the timer relay 72 and the override switch 74 is interrupted. The override switch 74 can no longer be activated manually. This prevents overflow of lubricant within the reservoir 16 through manual operation. If power to the timer relay 72 is interrupted before the pre-set time is reached, the timer relay 72 is reset. At this point, the pump 12 does not operate. If power to the timer relay 72 is not interrupted before the pre-set time is reached, the timer relay 72 energizes and interrupts power to the interval relay 76. The pump 12 ceases to operate. An alarm indicator 84 can be provided to indicate to the operator that the pump 12 has cycled for the pre-set time and yet the float switch 60 has not risen. Typically, this would indicate that the container 14 is empty and must be replaced. The indicator 84 may also signify to the operator that the pump 12 has malfunctioned (i.e. removal of pressure source, a broken line, clogged line, etc.).

At this point, if the container 14 is empty, the container 14 must be re-filled or replaced. If the pump 12 has malfunctioned, proper operation must be restored. However, the machine will continue to operate automatically for some time after the system 10 has ceased to operate. The length of time is dependent on the height adjustment of the float switch 60 versus the lubricant level at which the machine tool will generate an alarm or indication due to a low lubricant level.

There are numerous advantages of the lubrication supply system of the present invention. One advantage is that the system requires less frequent replenishment of lubricant to the machine tool. Another advantage is that the system allows use of larger commercial or supply containers, which increases the amount of lubricant available to the reservoir of the machine. This reduces loss of production. Furthermore, the system prevents debris from entering the reservoir of the machine tool by drawing lubricant from a clean container and pumping directly into the reservoir. This helps maintain proper function of valves of distribution manifolds. This also reduces repair costs and loss of production due to machine malfunction. The system also improves safety of the working environment by drawing lubricant from a container and pumping directly into the reservoir, which eliminates spillage of lubricant onto the floor. Additionally, the system allows the supply container to be moved to a location near the machine. This is important in production cell applications where the lubricant pump reservoir of the machine tool might be located inside a cage. There will be no need to interrupt cell operation to manually replenish the reservoir. Finally, the alarm condition indicator of the system provides advance warning of a low lubricant level. The alarm indicator allows the machine operator to replace the supply container before the machine tool ceases to operate automatically due to a low oil level condition. This reduces loss of production time.

While the specific embodiments have been illustrated and described, numerous modifications come to mind without significantly departing from the spirit of the invention and the scope of protection is only limited by the scope of the accompanying claims.

What is claimed is:

1. A lubrication supply system for a self-lubricating manufacturing machine, the system comprising:
   a machine reservoir in fluid communication with the machine and adapted to contain and dispense fresh lubricant as required by the machine;
   a supply reservoir adapted to contain and dispense fresh lubricant to the machine reservoir as required by the machine reservoir, the supply reservoir in fluid communication with the machine reservoir;
   a transfer mechanism in communication with the supply reservoir and the machine reservoir; and
   a control system in communication with the transfer mechanism, the control system controlling operation of the transfer mechanism based on a desired lubricant level within the machine reservoir.

2. The system of claim 1, wherein the supply reservoir is an original supply container of lubricant in which the lubricant was shipped.

3. The system of claim 1, wherein the control system includes a lubricant level indicator in communication with the machine reservoir.

4. The system of claim 3, further including a connector having the lubricant level indicator attached thereto, the connector adapted to fit a plurality of different reservoir openings and adapted to connect a fluid conduit in communication with the supply reservoir to the machine reservoir.

5. The system of claim 4, wherein the connector is a reservoir cap and the lubricant level indicator is a float switch, the cap having an aperture adapted to accommodate a fluid conduit in communication with the supply reservoir.

6. The system of claim 5, wherein the float switch is adjustable to different levels within the machine reservoir that correspond to the desired lubricant level.

7. The system of claim 3, wherein the control system starts the transfer mechanism when the lubricant falls below the desired lubricant level and stops the transfer mechanism when the lubricant reaches the desired lubricant level.

8. The system of claim 7, wherein the control system includes a timer that stops the transfer mechanism when a predetermined amount of time elapses.

9. The system of claim 3, wherein the control system automatically operates the transfer mechanism in response to input from the lubricant level indicator.

10. The system of claim 3, wherein the lubricant level indicator is an active device that provides an output signal when the desired lubricant level is reached.

11. The system of claim 3, wherein the lubricant level indicator is a passive measurement device.

12. The system of claim 3, wherein the lubricant level indicator is a sight glass.

13. The system of claim 3, wherein the lubricant level indicator is a sensor.

14. The system of claim 3, wherein the lubricant level indicator is a float switch.

15. The system of claim 1, wherein the control system is a manually operated system that requires the transfer mechanism to be started by input from an operator.

16. The system of claim 1, wherein the transfer mechanism is a pump.

17. The system of claim 16, wherein the pump is disposed within the supply reservoir.

18. The system of claim 17, wherein the pump is a piston pump.

19. The system of claim 18, wherein the piston pump is a vacuum-operated piston pump.

20. A lubrication supply system for a self-lubricating manufacturing machine, the system comprising:
    a machine reservoir in fluid communication with the machine and adapted to contain and dispense fresh lubricant to the machine as required by the machine;
    a supply reservoir in fluid communication with the machine reservoir via a fluid conduit, the supply reservoir adapted to contain and dispense fresh lubricant to the machine reservoir as required by the machine reservoir;
    a pump in fluid communication with the supply reservoir and the fluid conduit; and
    a control system that starts operation of the pump when the lubricant within the machine reservoir falls below a desired level and stops operation of the pump when the lubricant within the machine reservoir reaches the desired level.

21. The system of claim 20, wherein the supply reservoir is a supply container of lubricant in which the lubricant was originally shipped.

22. The system of claim 20, wherein the pump is a vacuum-operated piston pump.

23. The system of claim 22, wherein the control system includes an interval relay that alternately opens and closes a pneumatic solenoid valve in communication with a pressure source to facilitate reciprocating movement of the piston within the pump via the pressure source.

24. The system of claim 23, wherein the control system further includes a float switch that starts the interval relay when the lubricant within the machine reservoir falls below the desired lubricant level and stops the interval relay when the lubricant within the machine reservoir reaches the desired lubricant level.

25. The system of claim 24, wherein the control system further includes a timer relay that stops the interval relay after a predetermined period of time expires.

26. The system of claim 25, wherein the control system further includes an override relay that temporarily disables the timer relay to allow the interval relay to operate the pump even after the predetermined amount of time expires.

27. A lubrication supply system for a manufacturing machine having a machine reservoir associated with a lubrication system integral with the machine, the machine reservoir adapted to contain and dispense fresh lubricant to the machine as required by the machine, the machine reservoir also including a fluid opening for refilling the machine reservoir, the system comprising:
   a connector engageable with the fluid opening of the reservoir, the connector including an aperture to accommodate a fluid conduit;
   a supply container of lubricant in fluid communication with the machine reservoir via the fluid conduit;
   a pump in fluid communication with the supply container and connected to the fluid conduit; and
   a control system in communication with the pump, the control system including a float switch attached to the connector that allows for operation of the pump when the float switch is activated and terminates operation of the pump when the float switch is de-activated.

28. The system of claim 27, wherein the pump is a piston pump.

29. A lubrication supply system for a manufacturing machine having a machine reservoir associated with a lubrication system integral with the machine, the machine reservoir adapted to contain and dispense fresh lubricant to the machine as required by the machine, the machine reservoir also including a fluid opening for refilling the machine reservoir, the system comprising:
   a connector engageable with the fluid opening of the reservoir, the connector including an aperture to accommodate a fluid conduit;
   a supply container of lubricant in fluid communication with the machine reservoir via the fluid conduit;
   a piston pump in fluid communication with the supply container and connected to the fluid conduit wherein the pump includes a moveable piston connected to a plunger and disposed within a first portion of the cylinder to define a first chamber and a second chamber within the first portion of the cylinder, a first valve in fluid communication with the first chamber and a second valve in fluid communication with the second chamber; and,
   a control system in communication with the pump, the control system including a float switch attached to the connector that allows for operation of the pump when the float switch is activated and terminates operation of the pump when the float switch is de-activated.

30. The system of claim 29, wherein the first and second valves of the pump are in fluid communication with an alternating pressure source controlled by the control system.

31. The system of claim 30, wherein the alternating pressure source is alternated by a pneumatic solenoid valve controlled by an interval relay of the control system.

32. The system of claim 30, wherein the pump includes an inlet check valve that allows lubricant to be drawn into the pump when the valve is in an open position.

33. The system of claim 32, wherein the pump includes an outlet check valve that allows lubricant to enter the fluid conduit when the valve is in an open position.

34. A vacuum-operated lubrication supply system for a machine having a lubricant reservoir associated with the machine, the system comprising:
   a supply container of lubricant in fluid communication with the lubricant reservoir of the machine; a piston cylinder pump in fluid communication with the supply container and the lubricant reservoir of the machine, the pump including a moveable piston connected to a plunger and disposed within a portion of the cylinder to define a first chamber and a second chamber within the first portion of the cylinder; and
   a control system including:
      a valve having a first valve outlet in fluid communication with the first chamber of the pump and a second valve outlet in fluid communication with the second chamber of the pump; the valve in fluid communication with a pressure source;
      a pump switch in communication with the valve to provide alternate opening and closing of the first and second valve outlets with respect to each other, thereby facilitating reciprocating movement of the piston and the attached plunger within the pump; and
      a float switch disposed within the reservoir and in communication with the pump switch, the float switch allowing the pump switch to operate when the float switch is activated.

35. The system of claim 34, further including a timer switch in communication with the pump switch and the float switch, the timer switch measuring a predetermined amount of time when the float switch is activated, disabling the pump switch after the predetermined amount of time expires, and re-setting when the float switch is de-activated before the predetermined amount of time expires.

36. The system of claim 35, further including an override switch in communication with the timer switch, the override switch allowing operation of the pump switch after the predetermined amount of time expires.

37. The system of claim 36, wherein the pump switch is an interval relay.

38. A lubrication supply system for a manufacturing machine having a lubricant reservoir adapted to contain and dispense fresh lubricant to the machine as required by the machine, the system comprising:
   a supply container of fresh lubricant in fluid communication with the reservoir;
   means for transferring lubricant from the supply container to the reservoir; and
   a control system in communication with the reservoir and the means for transferring lubricant, the control system controlling the transfer of lubricant in response to a desired lubricant level within the reservoir.

39. The system of claim 38, wherein the supply container of lubricant is an original supply container in which the lubricant was shipped.

40. A control system for a lubrication supply system of a machine having a lubricant reservoir associated with the machine, the lubrication supply system including a supply container of lubricant in fluid communication with the reservoir and a pump in communication with the supply container and the reservoir, the control system comprising:
   a pump switch in communication with the pump;
   a timer relay in communication with the pump switch; and
   a lubricant level indicator;
   wherein the pump switch starts the pump when the lubricant level indicator indicates that the lubricant level within the reservoir is below a desired lubricant level, the timer relay allows the pump switch to operate the pump for a predetermined period of time, and the pump switch stops the pump when the lubricant level indicator indicates that the lubricant level reaches the desired lubricant level within the reservoir.

41. A method of supplying lubricant to a lubricant reservoir of a machine from a supply container of lubricant, the method comprising the steps of:

automatically transferring lubricant from the supply container to the reservoir when the lubricant falls below a desired level within the reservoir;

stopping the transfer of lubricant when the lubricant reaches the desired level within the reservoir or when a predetermined amount of time expires; and resetting the predetermined amount of time when the lubricant reaches the desired level before the predetermined amount of time expires.

42. The method of claim 41, further including the step of triggering an indicator when the predetermined amount of time expires.

43. The method of claim 41, further including the step of initially transferring lubricant from the supply container to the reservoir to fill the reservoir to the predetermined level.

44. A lubrication supply system for a self-lubricating manufacturing machine having a machine reservoir adapted to contain and dispense fresh lubricant to the machine as required by the machine, the system comprising:

a supply reservoir in fluid communication with the machine reservoir and adapted to contain fresh lubricant; and a transfer mechanism to transfer lubricant from the supply reservoir to the machine reservoir as required by the machine reservoir.

45. The lubrication supply system of claim 44, wherein the supply reservoir is a commercially packaged container of lubricant.

46. A lubrication supply system for a self-lubricating manufacturing machine having a machine reservoir affixed to the machine, the system comprising:

a supply reservoir in fluid communication with the machine reservoir via a fluid conduit;

a vacuum-operated piston pump in fluid communication with the supply reservoir and the fluid conduit; and a control system that starts operation of the pump when the lubricant within the machine reservoir falls below a desired level and stops operation of the pump when the lubricant within the machine reservoir reaches the desired level, the control system including an interval relay that alternately opens and closes a pneumatic solenoid valve in communication with a pressure source to facilitate reciprocating movement of the piston within the pump via the pressure source.

* * * * *